United States Patent
Meunier et al.

(10) Patent No.: US 7,866,053 B2
(45) Date of Patent: Jan. 11, 2011

(54) APPARATUS FOR SENSING A MOUNT FOR OPTICAL LENSES AND ASSOCIATED METHOD

(75) Inventors: Jean-Marc Meunier, Oissel (FR); Jean-Jacques Videcoq, Pavilly (FR)

(73) Assignee: Briot International, Pont de l'Arche (FR)

( * ) Notice: Subject to any disclaimer, the term of this patent is extended or adjusted under 35 U.S.C. 154(b) by 194 days.

(21) Appl. No.: 12/318,441

(22) Filed: Dec. 30, 2008

(65) Prior Publication Data

US 2009/0172960 A1 Jul. 9, 2009

(30) Foreign Application Priority Data

Jan. 2, 2008 (FR) .................................. 08 50006

(51) Int. Cl.
*G01B 5/20* (2006.01)
*G02C 13/00* (2006.01)
(52) U.S. Cl. .......................................... 33/200; 33/507
(58) Field of Classification Search .................. 33/200, 33/507, 1 M, 28, 546, 551
See application file for complete search history.

(56) References Cited

U.S. PATENT DOCUMENTS

| | | | |
|---|---|---|---|
| 5,121,548 A | | 6/1992 | Daboudet et al. |
| 5,121,550 A | | 6/1992 | Wood et al. |
| 5,960,550 A | * | 10/1999 | Weir et al. .................... 33/28 |
| 6,671,973 B2 | * | 1/2004 | Takemura et al. ............ 33/551 |
| 6,745,616 B1 | * | 6/2004 | Katayama et al. ............. 33/551 |
| 6,873,423 B2 | * | 3/2005 | Huang ......................... 33/200 |
| 7,140,119 B2 | * | 11/2006 | Badami et al. ................ 33/507 |
| 2004/0016136 A1 | | 1/2004 | Igarashi et al. |
| 2005/0275802 A1 | | 12/2005 | Nauche et al. |
| 2008/0289200 A1 | | 11/2008 | Jouard |

FOREIGN PATENT DOCUMENTS

| | | |
|---|---|---|
| EP | 0172802 | 2/1986 |
| EP | 0424207 | 4/1991 |
| EP | 1600730 | 11/2005 |
| FR | 2669999 | 6/1992 |
| FR | 2893723 | 5/2007 |
| FR | 2934060 A1 * | 1/2010 |
| FR | 2935812 A1 * | 3/2010 |
| WO | 2007/045734 | 4/2007 |

* cited by examiner

*Primary Examiner*—R. Alexander Smith
(74) *Attorney, Agent, or Firm*—Wenderoth, Lind & Ponack, L.L.P.

(57) ABSTRACT

The apparatus (10) comprises a turret (50), rotatable about a first axis (B-B'), a slide (52) mounted on the turret (50) and a sensor (30) mounted for sliding in the slide (52) along a third axis (C-C') substantially parallel to the first axis (B-B'). It comprises means (34) for displacement of the sensor for displacing a contact surface (42) of the sensor along the mount (14) during the sensing of the mount. The displacement means (34) comprise means (70) for driving the turret (50) in rotation about the first axis (B-B'). The apparatus comprises control means (82) for controlling means (72) for displacement of the turret in a plane perpendicular to the first axis (B-B') and suitable for displacing the turret (50) in said plane when the turret is driven in rotation about the first axis (B-B') during the sensing of the mount.

11 Claims, 6 Drawing Sheets

APPARATUS FOR SENSING A MOUNT FOR OPTICAL LENSES AND ASSOCIATED METHOD

FIELD OF THE INVENTION

The present invention concerns an apparatus for sensing a mount for optical lenses, of the type comprising:
a frame comprising means for immobilising the mount;
a turret, mounted to be rotatable about a first axis on the frame, the first axis being intended to be placed substantially perpendicular to a mean directrix surface of the mount;
a slide mounted to slide on the turret along a second axis substantially perpendicular to the first axis;
a sensor mounted for sliding in the slide along a third axis substantially parallel to the first axis, the sensor being equipped with a transverse sensing member having a contact surface for contact with the mount;
means for displacement of the sensor about a rim of the mount in order to displace the contact surface about the mount during the sensing of the mount, the displacement means comprising means for driving the turret in rotation about the first axis; and
means for displacement of the turret in a plane substantially perpendicular to the first axis.

BACKGROUND OF THE INVENTION

Such a sensing apparatus is often coupled to a machine for grinding optical lenses, in order to measure the shape of the mount exactly, in three dimensions, before the lenses are ground to the exact shape of the mount.

To this end, the mount is fixed in pairs of clips present in the sensing apparatus.

A known sensing apparatus (EP-A-1 090 716) comprises a sensor mounted on a turret rotatable about a first axis perpendicular to a mean directrix surface of the mount. The sensor is also displaceable on the turret parallel to the first axis and perpendicularly to the first axis.

Before sensing takes place, the axis of rotation of the turret is brought substantially to the centre of a first mount rim using means for displacement in a plane perpendicular to the axis of rotation of the turret. Then, the turret is immobilised and the sensor is displaced relative to the turret in order to come into contact with the groove of the mount. The turret is then driven in rotation on at least one complete turn about its axis, while maintaining the sensor in contact with the bottom of the groove to follow the shape of the mount. The axis of rotation of the turret remains generally immobile during the rotation.

The sensing apparatus registers, for each angle θ of rotation of the turret, the height z of the mount, and the vector radius p, i.e. the distance which separates the contact surface of the sensor from the axis of rotation of the turret.

The dimensions of the mount must be taken with great accuracy, since any error in the acquisition of the dimensions of the mount will result in defects in the ground shape, which subsequently cause difficulties in assembling the lenses on the mount.

The sensing apparatus described in EP-A-1 090 716 is satisfactory when the mounts are rigid and are substantially in the shape of a circle.

However, the mounts of spectacles are becoming more flexible and nowadays have elongated shapes with sharp angles. In this case, the apparatus of the aforesaid type does not give complete satisfaction.

If the sensor is really perpendicular to the groove of the mount in the non-angular parts thereof, as soon as the sensor reaches a corner of the mount, it then assumes a configuration almost parallel to the local axis of the sections of the mount.

In this case, taking into account the sudden variation in local orientation of the mount when passing the corner, the sensor exerts a force on the mount sufficient to cause it to shift or to deform it locally. In this case, the taking of the dimensions of the mount is inaccurate, thereby leading to defects during grinding.

It is therefore an aim of the invention to provide a sensing apparatus which makes it possible to carry out reliably and accurately the sensing of a mount having elongate and/or angular shapes.

SUMMARY OF THE INVENTION

To this end, the subject of the invention is a sensing apparatus of the aforesaid type, characterized in that the apparatus comprises control means for controlling the means for displacement of the turret in the plane substantially perpendicular to the first axis and suitable for displacing the turret in the plane substantially perpendicular to the first axis about a central active position while the turret is being driven in rotation about the first axis by the rotational drive means, during the sensing of the mount.

The sensing apparatus according to the invention may comprise one or more of the following characteristics, taken singly or in any technically possible combinations:
the means for displacement of the turret in the plane perpendicular to the first axis comprise means for driving the turret in translation relative to the frame along a translation axis located in the perpendicular plane;
the control means for controlling the means for displacement of the turret in the substantially perpendicular plane comprise storage means for storing a predetermined curve connecting the position of the turret about the central active position to each angular position of the turret about the first axis during the sensing of the mount;
it comprises means for registering a plurality of preceding positions of the contact surface during the sensing of the mount, and means for calculating the successive positions of the turret in the plane perpendicular to the first axis for each angular position of the turret during the sensing of the same mount, according to the plurality of preceding positions registered by the registering means;
it comprises acquisition means for acquiring data relating to a simplified profile of the mount, and means for calculating the position of the turret in the plane perpendicular to the first axis for each angular position of the turret according to the data of the simplified profile which are acquired by the acquisition means;
the acquisition means comprise means for taking a digital image of the mount; and
the slide is displaceable in translation on the turret along the second axis between an advanced position, in which the contact surface of the sensing member protrudes on a first side of a median plane perpendicular to the second axis passing through the first axis, and a retracted position in which the contact surface is placed entirely on a second side of the median plane, the second side being opposed to the first side.

The invention also has as its subject a method for sensing a mount for optical lenses, characterized in that it comprises the following steps:
placing the mount in the immobilising means of a sensing apparatus as defined above;

positioning the contact surface of the sensor in contact with the mount;

displacement of the sensor along the mount comprising the rotation of the turret about the first axis while maintaining the contact surface of the sensor in contact with the mount; and during this rotation:

displacement of the turret about a central active position in a plane substantially perpendicular to the first axis.

The sensing method according to the invention may comprise one or more of the following characteristics, taken singly or in any of the technically possible combinations:

the control of the means for displacement of the turret in the perpendicular plane by the control means takes place according to a predetermined curve connecting each angular position of the turret about the first axis to a position of the turret in the plane perpendicular to the first axis, the predetermined curve being stored in storage means of the control means;

the control step comprises the registering of a plurality of previous positions of the sensor during the sensing of the mount, and the calculation, for each successive angular position of the turret about the first axis during the sensing of the same mount, of a position of the turret relative to the frame according to the plurality of previous positions registered; and it comprises a step of acquisition of data relating to a simplified profile of the mount, the control step comprising the calculation of the position of the turret relative to the frame for each angular position of the turret about the first axis according to the simplified profile data obtained in the acquisition step.

BRIEF DESCRIPTION OF THE DRAWINGS

The invention will be more clearly understood from the following description, provided solely by way of example, with reference to the appended drawings, in which.

DETAILED DESCRIPTION OF THE PREFERRED EMBODIMENT

Figure 1:
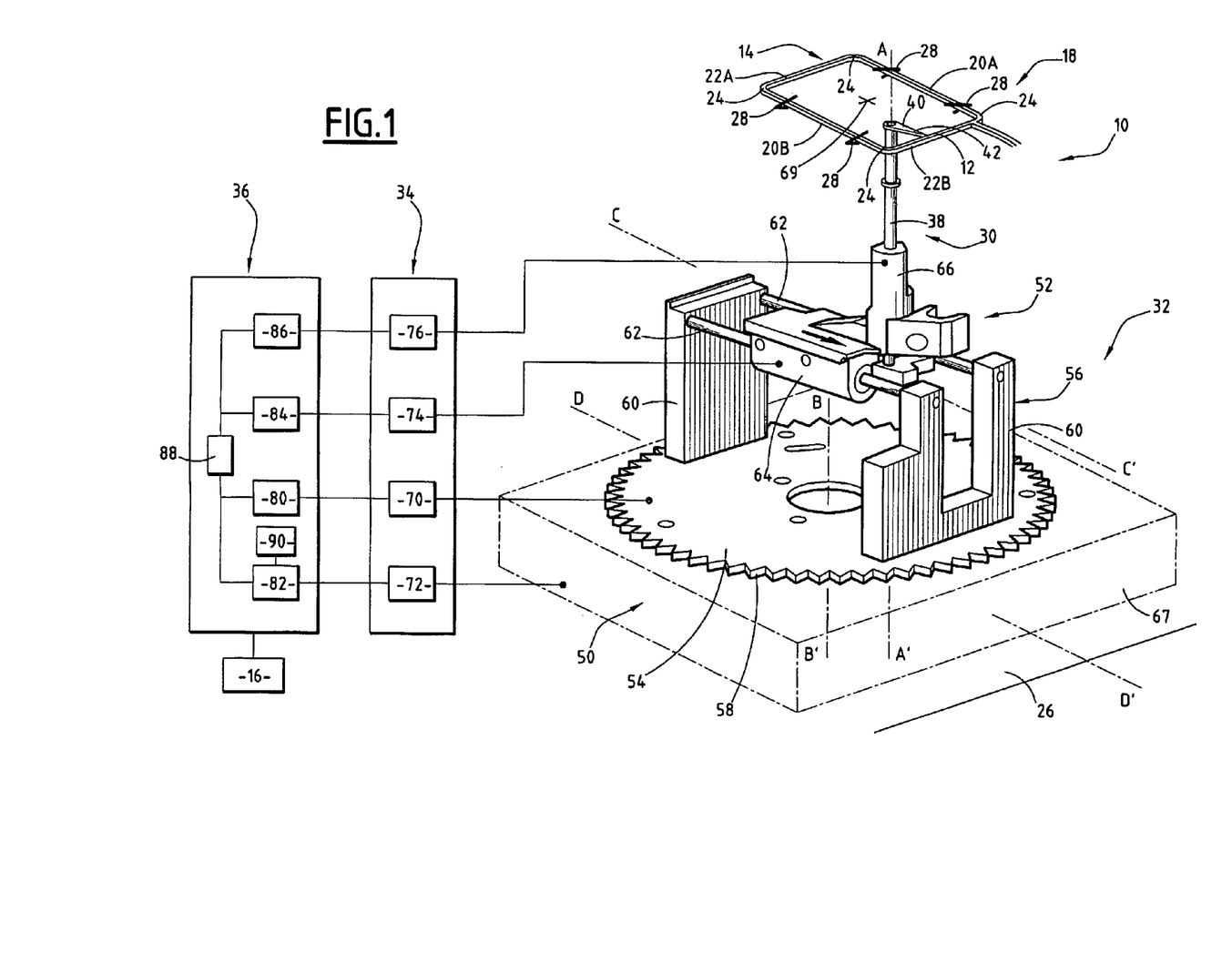
FIG. 1 is a partially perspective schematic view of the pertinent parts of a first sensing apparatus according to the invention.
Figure 2:
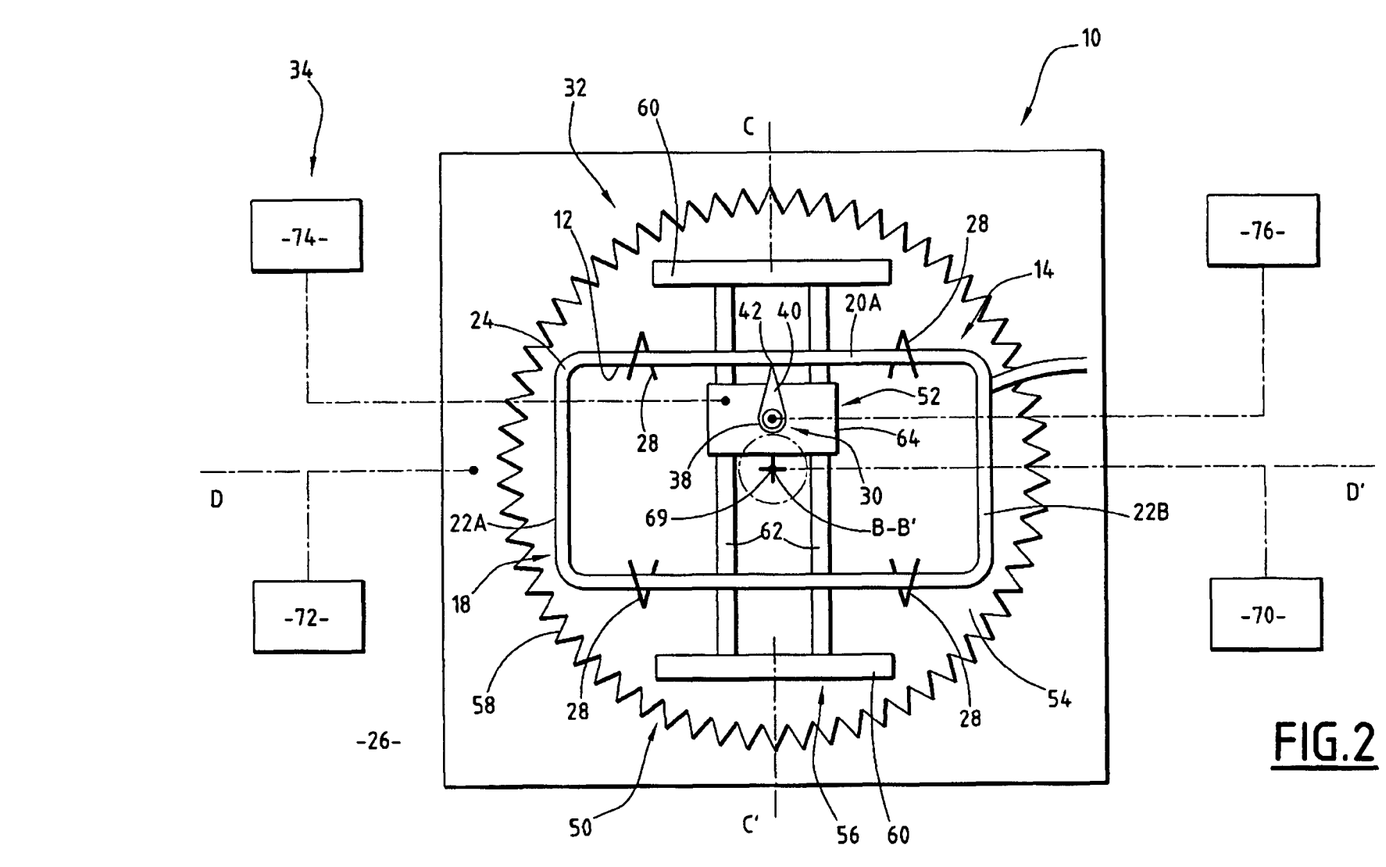
FIG. 2 is a top view of the apparatus of FIG. 1, at the start of a method of sensing an elongate and angular spectacle mount.
Figure 3:
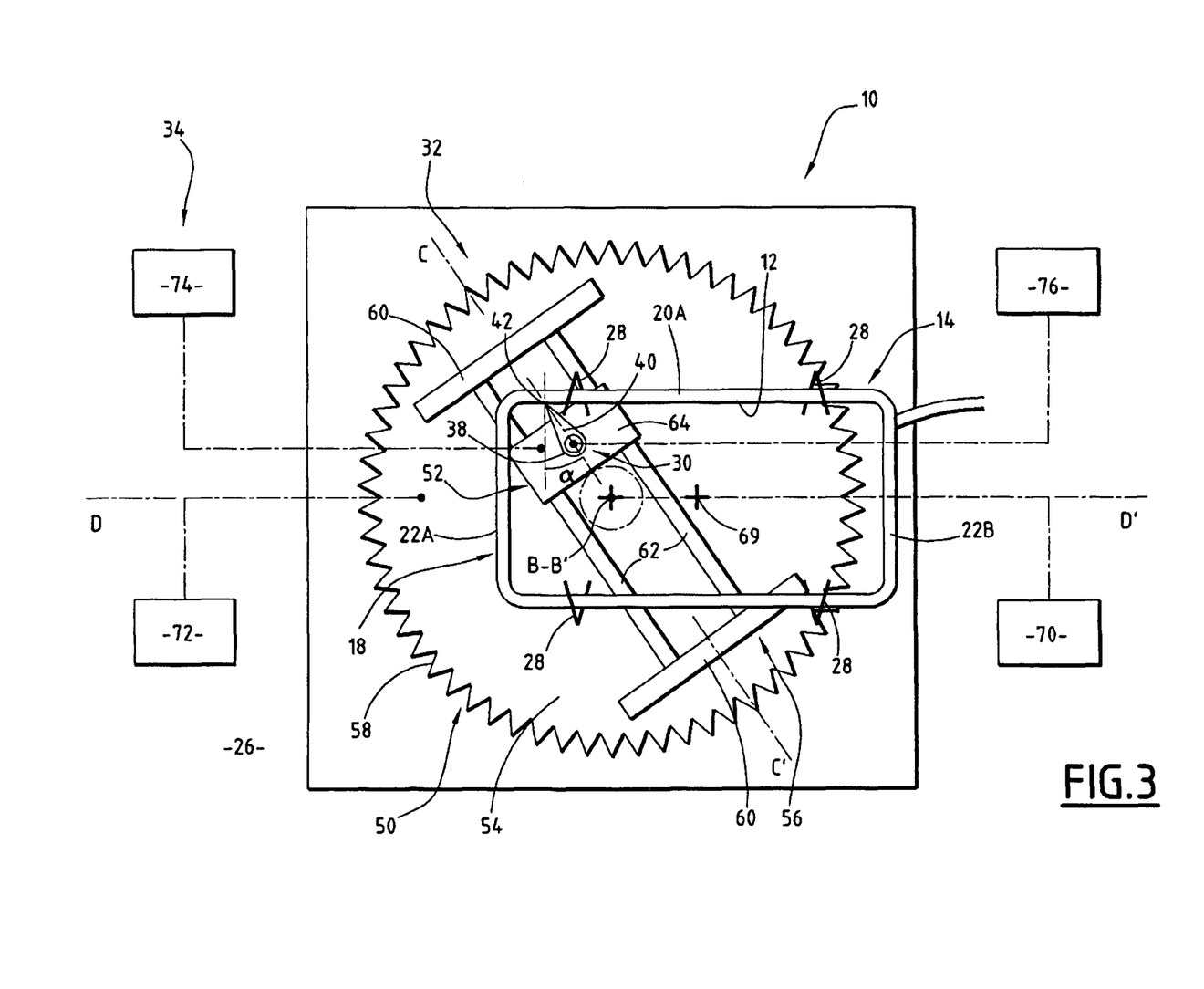
FIG. 3 is a view analogous to FIG. 2, during the passage of a corner of the mount.

A first sensing apparatus 10 according to the invention is shown in FIGS. 1 to 3.

The apparatus 10 is intended to measure the exact profile of a groove 12 defined in a mount 14 for optical lenses, shown partially in FIGS. 1 to 3. The sensing apparatus 10 is arranged in a machine 16 for grinding optical lenses, for example of the type described in application FR-A-2 852 878 by the Applicant.

As illustrated in FIGS. 1 and 2, the mount 14 comprises two mount rims 18, only one of which is visible in these Figures. Each mount rim 18 defines internally a groove 12.

Each mount rim 18 has a substantially horizontal mean directrix surface in FIG. 1. Each rim 18, in projection in a horizontal plane, has an elongate and angular contour. Thus, it comprises two sections, upper 20A and lower 20B, connected to each other by two lateral sections 22A, 22B having a length which is shorter by a factor of at least two. Each rim 18 comprises between each section 20A, 20B and an adjacent section 22A, 22B an angular portion 24 forming an angle of approximately 90°.

The groove 12 is provided inside the mount rim 18 over the whole inner periphery of the mount rim 18. It has, for example, a substantially V-shaped cross-section.

With reference to FIGS. 1 to 3, the sensing apparatus 10 comprises a frame 26, clips 28 for immobilising the mount 14 relative to the frame 26, a movable sensor 30 mounted on a sensor support 32, and means 34 for displacement of the sensor 30 relative to the frame 26.

The apparatus 10 further comprises a central control and computing unit 36 for operating and registering the displacement of the sensor 30 relative to the frame 26, during the sensing of the mount 14.

The clips 28 are for example of the type described in Application FR-A-2 754 356. The clips 28 are adapted to maintain the mount 18 substantially horizontal above the sensor support 32.

In the example shown in FIGS. 1 to 3, the apparatus 10 comprises two pairs of clips 28 placed in a horizontal plane and intended to grasp, respectively, the upper section 20A and the lower section 20B.

The sensor 30 comprises a vertical support rod 38 extending along a vertical displacement axis A-A', and a sensor blade 40 transverse with respect to the axis A-A', and fixedly mounted at the upper end of the rod 38.

The blade 40 protrudes radially away from the axis A-A'. It has a pointed or rounded end which delimits a surface 42 for contact with the groove 12 of the mount 14.

The sensor support 32 comprises a turret 50 rotatable about a vertical turret rotation axis B-B', and a slide 52 borne by the turret 50 and displaceable along a horizontal slide axis C-C' perpendicular to the axis B-B'. The slide 52 receives the sensor 30 so that it slides.

The turret 50 comprises a horizontal circular plate 54 with axis B-B' and a framework 56 for supporting and guiding the slide 52.

The plate 54 is equipped at its periphery with a set of teeth 58 so as to be driven in rotation about the axis B-B'.

The framework 56 comprises two vertical riders 60 placed opposite each other at the periphery of the plate 54, and two horizontal parallel rods 62 mounted on each side of a diameter of the plate 54 above the latter.

The slide 52 comprises a carriage 64 mounted to slide on the rods 62 along the axis C-C'. The axis C-C" is displaced in rotation about the axis B-B' during the displacement of the turret 50 about the axis B-B'.

The carriage 64 carries a vertical guide sleeve 66 for guiding the rod 38 of the sensor, extending along the axis A-A'. The sleeve 66 protrudes vertically upwards relative to the carriage 64, and has a central guide passage for guiding the rod 38 and in which the rod 38 is mounted to slide along its axis A-A'.

The sleeve 66 comprises indexing means (not shown) for angular indexing of the rod 38 to prevent the rotation of the rod 38 and of the sensor blade 40 about the axis A-A'. The blade 40 thus extends radially relative to the axis B-B', parallel to the axis C-C'.

The turret 50 is displaceable in rotation about the axis B-B' relative to the frame 26. It is further connected to the frame 26 by guide means 67 so as to be displaceable relative to the frame 26 along a horizontal axis D-D' passing through its axis of rotation B-B'. As will be seen hereinafter, the turret 50 is thus displaceable along the axis D-D' towards each mount rim 18, between a retracted rest position, away from the clips 28, and a central active position for sensing the mount rim 18.

In each central active position, the axis B-B' of the turret extends between the clips 28 substantially at the centre 69 thereof and substantially at the centre of the rim 18 of the mount 14 when the latter is mounted in the clips 28.

As will be seen hereinafter, and according to the invention, the rotation axis B-B' of the turret 50 is moreover locally displaceable along the horizontal axis D-D' about the central active position, during the sensing of the mount 14.

As illustrated in FIG. 1, the displacement means 34 for the sensor comprise means 70 for driving the turret 50 in rotation about the axis B-B', means 72 for displacement of the axis of rotation B-B' of the turret 50 along the horizontal axis D-D', means 74 for displacement of the slide 52 on the rods 62 along the horizontal axis C-C', and means 76 for displacement of the vertical rod 38 of the sensor 30 along the vertical axis A-A' in the sleeve 66.

The rotational drive means 70 comprise an actuator suitable for engaging the peripheral teeth 58 in order to rotate the plate 54 about the axis B-B'. The drive means 70 are suitable for rotating the turret 50 about the axis B-B' through an angle of at least 360° continuously or in pulses of the order of 0.1°, especially 0.18°.

The means 72 for displacement of the turret along the axis B-B' comprise, for example, a screw-and-nut system or a rack-and-pinion system.

They are suitable for rapidly displacing the turret 50 between its retracted position and each central active position.

Moreover, they are suitable for finely displacing the turret 50 about each central active position by a displacement p continuously or in pulses of 0.01 mm.

The means 74 for displacement of the slide 52 are suitable for displacing the carriage 64 along the rods 62 towards the groove 12 of the mount 14. They are suitable for applying the contact surface 42 against the bottom of the groove 12 with a regulated force, for example of between 10 g and 50 g.

The means 76 for displacement of the rod 38 are suitable for displacing the rod 38 and the sensor blade 40 vertically along the axis A-A' in order to maintain it in contact with the groove whatever the local inclination of the mount relative to the horizontal.

The central unit 36 comprises control means 80 for controlling the rotational drive means 70, control means 82 for controlling the horizontal displacement of the axis B-B' of the turret 50 along the axis D-D', control means 84 for controlling the means 74 for displacement of the slide 52, and control means 86 for controlling the means for displacement 76 of the rod 38. The central unit 36 further comprises registering means 88 for registering the position of the sensor 30.

The control means 80 are suitable for operating the rotational drive means 70 during sensing in order to rotate the sensor blade through 360° in pulses of the order of 0.1° during its displacement about and along the mount.

The control means 82 are suitable for activating the displacement means 72 in order to displace the turret 50 between its retracted position and each active position opposite a mount rim 18.

According to the invention, the control means 82 are moreover suitable for operating the displacement means 72 for locally displacing the turret 50 along the axis D-D' about its central active position during the sensing of a rim 18 of the mount 14, when the contact surface 42 moves in the groove 12 about the rim 18 of the mount 14.

Figure 4:
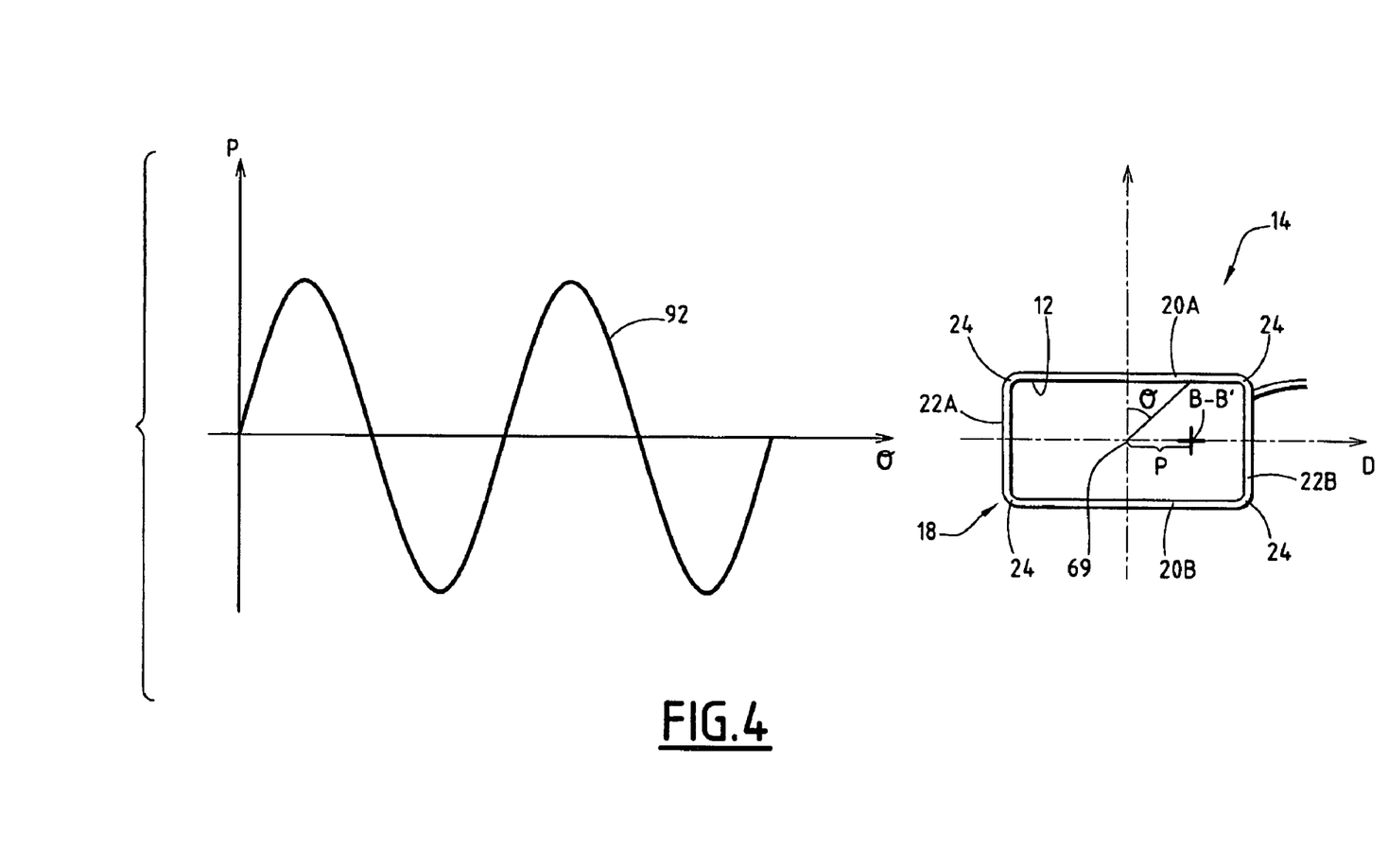
FIG. 4 is a view of a predetermined curve of the displacement of the centre of the turret of the sensing apparatus relative to the centre of the mount according to the angle of rotation of the turret.

To this end, in a first embodiment of the invention, the control means 82 comprise storage means 90 for storing a predetermined curve 92 for the displacement p of the axis of rotation B-B' of the turret 50 about the central active position according to the angle θ of rotation of the turret during the sensing of a rim 18 of the mount 14, taken with respect to the initial angular position of the turret 50, at the start of sensing. Such a curve is shown for example in the form of a sinusoidal-type curve in FIG. 4.

The control means 82 are suitable for reading the data present in the storage means 90 in order, for each angle θ of rotation of the turret 50 measured about its axis B-B' by the control means 80, to operate the corresponding displacement p of the turret 50 relative to the central active position along the axis D-D' by the displacement means 72.

The registering means 88 are suitable for registering the position of the sensor 30 during sensing and, especially, for each angle θ of rotation of the turret relative to its initial reference position, the angle θ of rotation of the turret 50 about its axis B-B', the radial position p of the contact surface 42 relative to the axis B-B' of the turret 50 during the displacement of the slide 64 along the rods 62, the height z of the contact surface 42 during the displacement of the rod 38 in the sleeve 66 along the axis A-A' and, according to the invention, the displacement p of the axis B-B' of the turret 50 along the axis D-D' relative to the central active position located substantially at the centre of the clips 28.

The sensing method according to the invention in the sensing apparatus 10 will now be described for the sensing of a rim 18 of a mount 14, with reference to the flow chart shown in FIG. 5.

Initially, the turret 50 occupies its retracted rest position, away from the clips 28. The mount 14 which is to be sensed is inserted into the clips 28 in order to be immobilised relative to the frame 26.

The operator then starts the sensing. The unit 36 then actuates the means 82 for displacement of the turret along the axis D-D' to cause the turret 50 to pass from its rest position to a first central active position in which the axis of rotation B-B' of the turret 50 is located substantially at the centre 69 of the clips 28 and of the mount rim 18.

Figure 5:
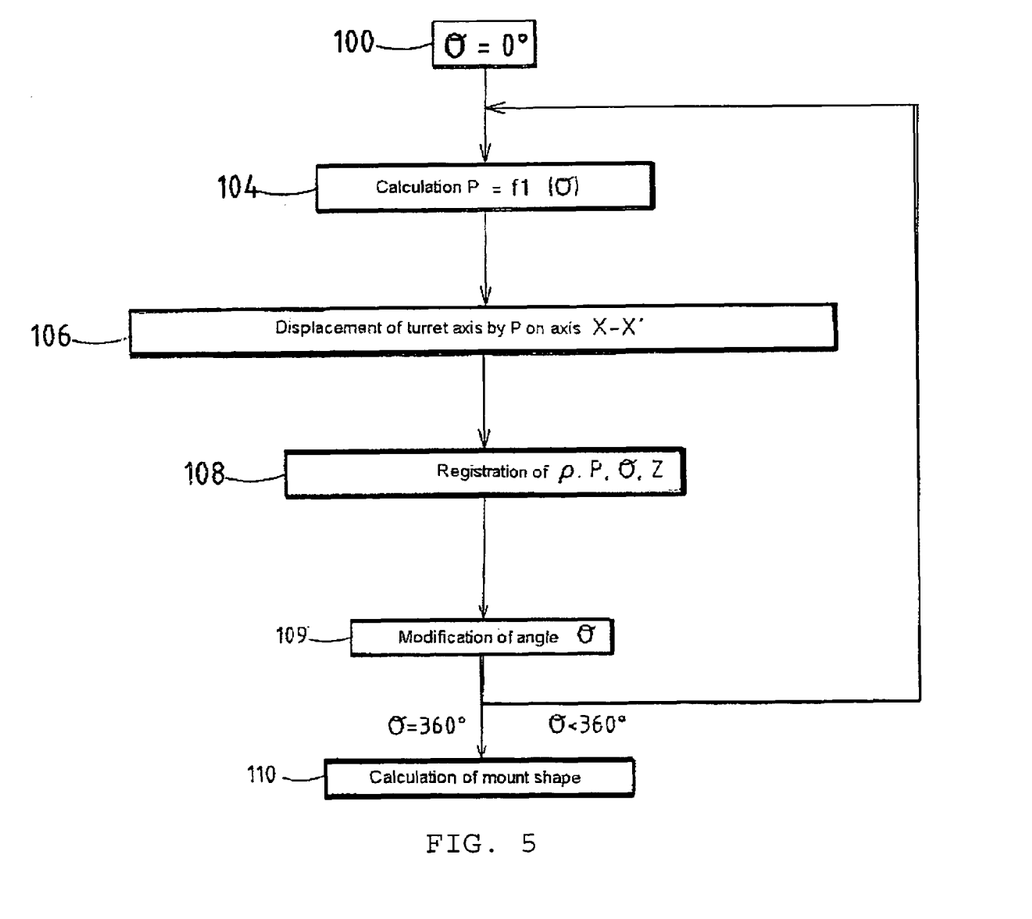
FIG. 5 is a flow chart illustrating the different steps of a sensing method according to the invention.

As indicated in step 100 in FIG. 5, the angle of rotation θ of the turret is then 0° with respect to the reference.

Then in step 104, for the initial value of θ and for each successive value of θ, the control means 82 determine, starting from the curve 92 stored in the storage means 90, what is the value of the displacement p of the axis of rotation B-B' of the turret 50 relative to the central active position corresponding to this value of θ.

In step 106, the control means 82 operate the means 72 for displacement of the turret 50 along the axis B-B' according to the value p obtained in step 104.

In the example shown in FIG. 2, the axis B-B' of the turret coincides with the central position of reference for the value of θ equal to 0, as shown on the curve 92.

On the other hand, in the example shown in FIG. 3, which corresponds to an angle θ substantially equal to 45°, the turret 50 has been displaced towards the left-hand section 22A by a non-zero distance p substantially equal to half the distance separating the centre 69 of the mount rim 18 from the outer section 22A.

Simultaneously, the control means 84 and the control means 86 respectively operate the means 74 for radial displacement of the slide and the means 76 for vertical displacement of the rod in order to maintain the contact surface 42 of the sensing blade 40 in contact with the bottom of the groove 12, as illustrated in FIG. 2.

In step 108, the registering means 88 register the angle θ of rotation of the turret 50, the radial position p of the contact surface 42, the height z of the surface 42 and the displacement p of the centre of the turret B-B' relative to the reference position on the frame 26. Then, in step 109, the position of the angle θ is modified and steps 104 to 108 are repeated as long as the angle θ is less than 360°.

According to the invention, the control means 82 operate the displacement means 72 to maintain the angle α formed locally by the normal to each section 20A, 20B, 22B at the point of contact with the contact surface 42, and the radial axis C-C' of the sensing blade 40 has a value close to 0° and in any case between −45° and +45°, for each angle θ of rotation of the turret about its axis B-B'.

When the angle θ is equal to 360°, the sensing of the rim 18 is halted. The shape of the mount rim 18 can then be calculated by the unit 36, to be transmitted to the grinding machine 16 in order to machine the lens to the dimensions of the mount 14.

Once this is done, the turret 50 is displaced by the displacement means 72 towards the second mount rim 18 (not shown) and the sensing method is implemented in a similar manner on the rim 18.

In a first variant, the sensing apparatus 10 is devoid of storage means 90 for storing a predetermined curve of the displacement p of the turret 50 along the axis D-D' according to the angle of rotation θ of the turret about its axis B-B'.

The control means then comprise means for registering a plurality of previous positions of the sensor 30 during the sensing of the mount rim 18, and means for calculating a local curvature of the mount for angles θ just below the angle θ assumed by the sensor 30 at a given moment.

Thus, the means for calculating the local curvature are suitable for determining whether the sensor 30 is in a substantially linear region of the mount 14 or, on the contrary, in an angular region, for example by calculating the local radius of curvature on the basis of the acquisition of the values of σ, p, p, and z carried out during the ten last variations of the angle θ on the same mount 14.

The control means 82 then comprise means for automatic control of the displacement p according to the local curvature calculated and suitable for regulating the distance separating the axis B-B' from the central active position in order to maintain the angle α formed between the axis C-C' of the sensing blade 40 and the normal to the mount at the point of contact of the contact surface 42, calculated from the local curvature, at a value of between −45° and +45°.

The implementation of the second method according to the invention then comprises the calculation, for each angle θ, of the local curvature of the mount 14 on the basis of the values acquired for several previously acquired angles θ and the displacement of the centre of the turret by p according to the predetermined control rule.

In a second variant, the apparatus 10 comprises means for taking a digital image of the mount 14 to determine a simplified profile of the mount 14 less accurate than the sensed profile. The simplified profile is for example in two dimensions and comprises a number of points which are less than the number of pulses necessary for displacing the turret through 360° about its axis B-B' using the drive means 70.

The control means 82 comprise means for calculating the position p of the centre of the turret for each angle of rotation θ according to the simplified profile determined by means of the digital image.

Thus, the displacement p may be calculated from the simplified profile for example by maintaining the angle α which would be formed between the axis C-C' of the sensing blade 40 and the normal to the simplified profile of the mount at the theoretical point of contact of the contact surface 42 at a value of between −45° and +45°.

The third method according to the invention therefore comprises the taking of a digital image of the mount rim 18, then the calculation of a simplified profile of the rim 18 on the basis of digital processing of the image, and the determination of a control rule for the displacement p according to the angle θ in order to maintain the angle α between the sensor and the normal to the simplified profile determined of between −45° and +45°.

In a third variant, the simplified profile is determined by rapid preliminary sensing of the mount rim 18 while, for example, maintaining the central axis of the turret 50 immobile during the rapid sensing, or by displacing this axis according to a first control rule. Then, the method comprises the determination of a new control rule for the displacement p according to the angle θ on the basis of the simplified profile determined during the rapid preliminary sensing.

Figure 6:
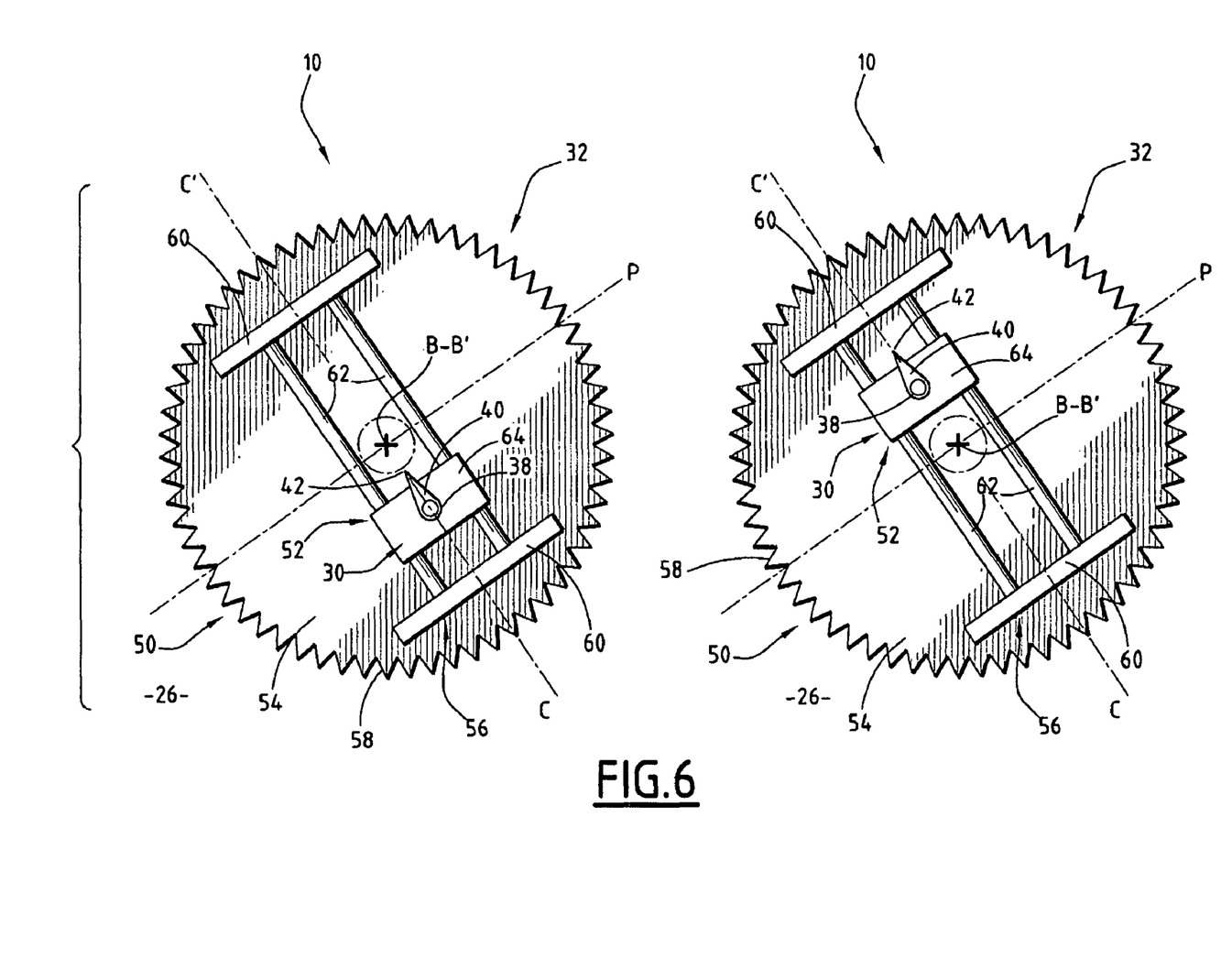
FIG. 6 is a view analogous to FIG. 2, illustrating two possible configurations of the position of the sensor on the turret of a variant of a sensing apparatus according to the invention.

In another variant, shown in FIG. 6, the slide 52 is configured so as to move between an advanced position shown on the right in FIG. 6, in which the sensing surface 42 and the sensing blade 40 protrude radially on a first side of a median vertical plane P passing through the axis B-B' of the turret and perpendicular to the axis C-C' of displacement of the carriage, and a retracted position shown on the left in FIG. 6, in which the rod 38, the blade 40 and the contact surface 42 are entirely located on the opposite side from the first side relative to the median plane P.

Such a configuration of the slide 52 permits the sensing of a mount having lateral sections 22A, 22B which are very short.

What is claimed is:

1. A sensing apparatus for sensing a mount for optical lenses, of the type comprising:
   a frame comprising means for immobilising the mount;
   a turret, mounted to be rotatable about a first axis on the frame, the first axis being intended to be placed substantially perpendicular to a mean directrix surface of the mount;
   a slide mounted to slide on the turret along a second axis substantially perpendicular to the first axis;
   a sensor mounted for sliding in the slide along a third axis substantially parallel to the first axis, the sensor being equipped with a transverse sensing member having a contact surface for contact with the mount;
   means for displacement of the sensor about a rim of the mount in order to displace the contact surface about the mount during the sensing of the mount, the displacement means comprising means for driving the turret in rotation about the first axis; and
   means for displacement of the turret in a plane substantially perpendicular to the first axis; wherein the apparatus comprises control means for controlling the means for displacement of the turret in the plane substantially perpendicular to the first axis and suitable for displacing the turret in the plane substantially perpendicular to the first axis about a central active position while the turret is driven in rotation about the first axis by the rotational drive means, during the sensing of the mount.

2. An apparatus according to claim 1, wherein the means for displacement of the turret in the plane perpendicular to the first axis comprise means for driving the turret in translation relative to the frame along a translation axis located in the perpendicular plane.

3. An apparatus according to claim 1, wherein the control means for controlling the means for displacement of the turret in the substantially perpendicular plane comprise storage means for storing a predetermined curve connecting the position of the turret about the central active position to each angular position of the turret about the first axis during the sensing of the mount.

4. An apparatus according to claim 1, wherein it comprises means for registering a plurality of preceding positions of the contact surface during the sensing of the mount, and means for calculating the successive positions of the turret in the plane perpendicular to the first axis for each angular position of the turret during the sensing of the same mount, according to the plurality of preceding positions registered by the registering means.

5. An apparatus according to claim 1, wherein it comprises acquisition means for acquiring data relating to a simplified profile of the mount, and means for calculating the position of the turret in the plane perpendicular to the first axis for each angular position of the turret according to the data of the simplified profile which are acquired by the acquisition means.

6. An apparatus according to claim 5, wherein the acquisition means comprise means for taking a digital image of the mount.

7. An apparatus according to claim 1, wherein the slide is displaceable in translation on the turret along the second axis between an advanced position, in which the contact surface of the sensing member protrudes on a first side of a median plane perpendicular to the second axis passing through the first axis, and a retracted position in which the contact surface is placed entirely on a second side of the median plane, the second side being opposed to the first side.

8. A method for sensing a mount for optical lenses, wherein it comprises the following steps:
placing the mount in the immobilising means of a sensing apparatus according to claim 1;
positioning the contact surface of the sensor in contact with the mount;
displacement of the sensor along the mount comprising the rotation of the turret about the first axis while maintaining the contact surface of the sensor in contact with the mount; and during this rotation:
displacement of the turret about a central active position in a plane substantially perpendicular to the first axis.

9. A method according to claim 8, wherein the control of the means for displacement of the turret in the perpendicular plane by the control means takes place according to a predetermined curve connecting each angular position of the turret about the first axis to a position of the turret in the plane perpendicular to the first axis, the predetermined curve being stored in storage means of the control means.

10. A method according to claim 8, wherein the control step comprises the registering of a plurality of previous positions of the sensor during the sensing of the mount, and the calculation for each successive angular position of the turret about the first axis during the sensing of the same mount, of a position of the turret relative to the frame according to the plurality of previous positions registered.

11. A method according to claim 8, wherein it comprises a step of acquisition of data relating to a simplified profile of the mount, the control step comprising the calculation of the position of the turret relative to the frame for each angular position of the turret about the first axis according to the simplified profile data which are obtained in the acquisition step.

* * * * *